US012261381B2

(12) United States Patent
Yun et al.

(10) Patent No.: US 12,261,381 B2
(45) Date of Patent: Mar. 25, 2025

(54) DUAL-OPEN-RING WEARABLE ANTENNA

(71) Applicant: IUCF-HYU (INDUSTRY-UNIVERSITY COOPERATION FOUNDATION HANYANG UNIVERSITY), Seoul (KR)

(72) Inventors: Tae-Yeoul Yun, Seoul (KR); Tu Tuan Le, Seoul (KR); Yong Deok Kim, Seoul (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 133 days.

(21) Appl. No.: 18/164,552

(22) Filed: Feb. 3, 2023

(65) Prior Publication Data

US 2023/0253711 A1 Aug. 10, 2023

(30) Foreign Application Priority Data

Feb. 4, 2022 (KR) ........................ 10-2022-0014949

(51) Int. Cl.
*H01Q 9/26* (2006.01)
*H01Q 1/27* (2006.01)
(Continued)

(52) U.S. Cl.
CPC ............. *H01Q 9/265* (2013.01); *H01Q 1/273* (2013.01); *H01Q 5/371* (2015.01); *H01Q 9/0421* (2013.01); *H01Q 9/0464* (2013.01)

(58) Field of Classification Search
CPC ...... H01Q 1/273; H01Q 5/371; H01Q 9/0407; H01Q 9/0421; H01Q 9/0464; H01Q 7/00
See application file for complete search history.

(56) References Cited

U.S. PATENT DOCUMENTS 8,390,516 B2 * 3/2013 Parsche .................... H01Q 7/00 343/788
2017/0047660 A1 * 2/2017 Manry, Jr. ............ H01Q 9/0457

FOREIGN PATENT DOCUMENTS

CN 109755736 A * 5/2019
EP 3 902 063 A1 10/2021
(Continued)

OTHER PUBLICATIONS

Tu Tuan Le; Han-Young Park; Tae-Yeoul Yun, "A Triple-Band Dual-Open-Ring High-Gain High-Efficiency Antenna for Wearable Applications," in IEEE Access, vol. 9, pp. 118435-118442, 2021, doi: 10.1109/ACCESS.2021.3107605.

*Primary Examiner* — Daniel Munoz

(57) ABSTRACT

A wearable antenna comprises: an upper substrate made of a solid material; an inner open ring radiator formed on an upper surface of the upper substrate and having a first slit formed therein; an outer open ring radiator formed in a ring shape having the same center as the inner open ring radiator and having a larger radius on the upper surface, and having a second slit formed therein to open a partial area; a feeding portion formed on a lower surface of the upper substrate and transmitting a feed signal applied from an input port to each of the two open ring radiators through two vias penetrating the upper substrate; a lower substrate spaced apart from the lower surface of the upper substrate by a predetermined distance and made of a flexible material; and a ground plane formed on a lower surface of the lower substrate.

8 Claims, 7 Drawing Sheets

(51) Int. Cl.
*H01Q 5/371* (2015.01)
*H01Q 9/04* (2006.01)

(56) References Cited

FOREIGN PATENT DOCUMENTS

| | | | |
|---|---|---|---|
| KR | 10-2012-0035273 | A | 4/2012 |
| KR | 10-2016-0045649 | A | 4/2016 |
| KR | 10-2019-0140750 | A | 12/2019 |
| KR | 10-2273255 | B1 | 6/2021 |
| KR | 10-2282029 | B1 | 7/2021 |
| KR | 10-2022-0012005 | A | 2/2022 |

* cited by examiner

DUAL-OPEN-RING WEARABLE ANTENNA

CROSS-REFERENCE TO RELATED APPLICATIONS

This application claims priority under 35 U.S.C. 119(a) to Korean Patent Application No. 10-2022-0014949, filed on Feb. 4, 2022, in the Korean Intellectual Property Office, the disclosure of which is incorporated herein in its entirety by reference.

BACKGROUND

1. Technical Field

The present disclosure relates to a wearable antenna, more particularly to a dual-open-ring wearable antenna.

2. Description of the Related Art

Recently, wearable antennas for off-body communication required in various applications such as physical training, soldier tracking, medical and activity monitoring systems are attracting attention. Wearable antennas are mainly used to transmit data collected from body sensors to external devices or databases. Such a wearable antenna should not only have a small size, high gain, high efficiency, a directional radiation pattern, and a low specific absorption rate (SAR), but also should provide comfort to the wearer.

Previously, a single wearable antenna having a wide bandwidth has been mainly used to respond to various application programs, but there is a problem in that interference with other wireless systems occurs when using an antenna with a wide bandwidth.

STATEMENT REGARDING PRIOR DISCLOSURES BY THE INVENTOR OR A JOINT INVENTOR

At least one inventor or joint inventor of the present disclosure has made related disclosures in IEEE research paper (in IEEE Access, vol. 9, pp. 118435-118442, 2021, doi: 10.1109/ACCESS.2021.3107605) published on Aug. 24, 2021.

SUMMARY

An object of the present disclosure is to provide a tri-band wearable antenna.

Another object of the present disclosure is to provide a wearable antenna having high gain, high efficiency and low SAR.

Another object of the present disclosure is to provide a wearable antenna for off-body communication capable of providing a comfortable fit.

A wearable antenna according to an embodiment of the present disclosure, conceived to achieve the objectives above, comprises: an upper substrate made of a solid material; an inner open ring radiator formed in a ring shape on an upper surface of the upper substrate and having a first slit formed therein to open a partial area; an outer open ring radiator formed in a ring shape having the same center as the inner open ring radiator and having a larger radius on the upper surface of the upper substrate, and having a second slit formed therein to open a partial area; a feeding portion formed on a lower surface of the upper substrate and transmitting a feed signal applied from an input port to each of the two open ring radiators through two vias penetrating the upper substrate; a lower substrate spaced apart from a lower surface of the upper substrate by a predetermined distance and made of a flexible material; and a ground plane formed on a lower surface of the lower substrate.

The first slit and the second slit may be formed in a direction extending perpendicularly to each other.

The feeding portion may include: an arc line formed in an arc shape having an angular range corresponding to an angle difference between the first slit and the second slit; a feed line extending from a central position of the two open ring radiators to which the input port is connected on the lower surface of the upper substrate to one end of the arc line; and two extension lines extending from both ends of the arc line, to one end of the area side opened by the first and second slits in each of the inner open ring radiator and the outer open ring radiator.

An outer radius of the arc line may be smaller than an inner radius of the inner open ring radiator.

The two extension lines may have a line width smaller than a line width of the arc line and the feed line.

A first extension line of the two extension lines may extend from the other end of the arc line to one end of the inner open ring radiator, and be electrically connected to one end of the inner open ring radiator through a first via of the two vias. A second extension line may extend from one end of the arc line to one end of the outer open ring radiator, and be electrically connected to one end of the outer open ring radiator through a second via of the two vias.

Lengths of the first and second extension lines and an angular range of the arc line may be determined to be impedance-matched with the input port connected to the feed line.

The wearable antenna may further include a via passing through the upper substrate and the lower substrate and electrically connecting the other end of the outer open ring radiator and the ground plane.

The upper substrate may maintain a predetermined distance from the lower substrate by being supported by an input port that passes through the lower substrate and applies a feed signal to the feeding portion formed on the lower surface of the upper substrate.

Accordingly, the wearable antenna according to an embodiment of the present disclosure may have a triple band characteristic by being composed of a double open ring structure including an inner open ring radiator and an outer open ring radiator opened in different directions. In addition, with an upper substrate and a lower substrate spaced apart from each other, it has high gain, high efficiency and low SAR, and can provide a comfortable fit to the wearer.

DETAILED DESCRIPTION

Figure 1:
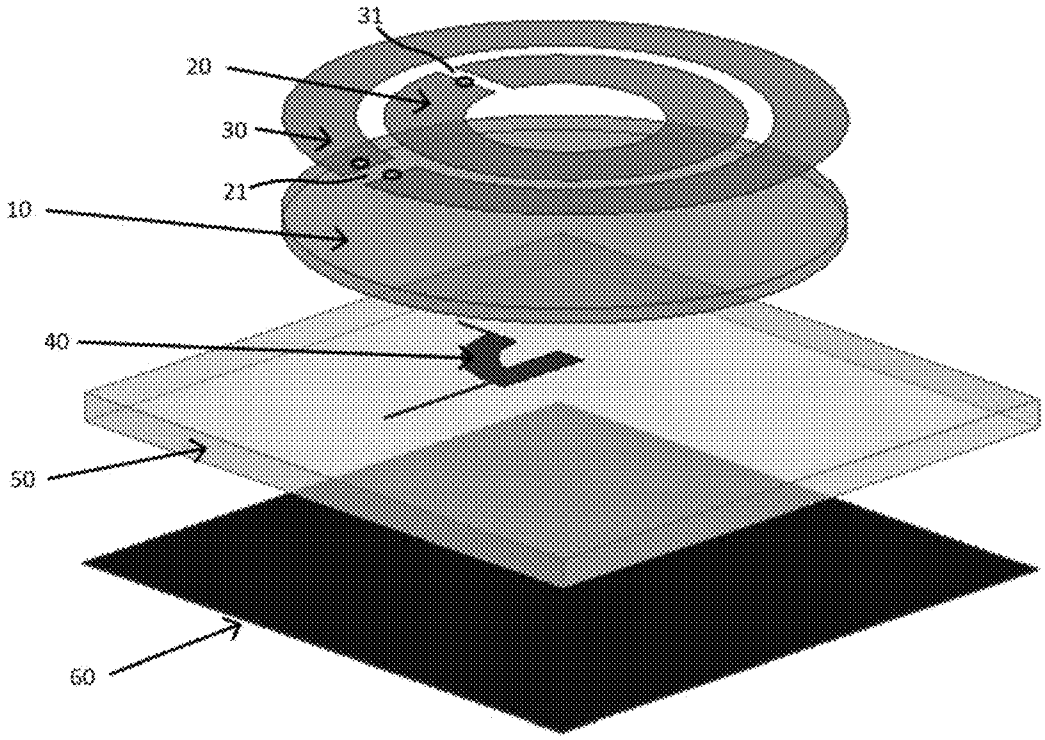
FIG. 1 shows an exploded perspective view of a wearable antenna according to an embodiment of the present disclosure.

In order to fully understand the present disclosure, operational advantages of the present disclosure, and objects achieved by implementing the present disclosure, reference should be made to the accompanying drawings illustrating preferred embodiments of the present disclosure and to the contents described in the accompanying drawings.

Hereinafter, the present disclosure will be described in detail by describing preferred embodiments of the present disclosure with reference to accompanying drawings. However, the present disclosure can be implemented in various different forms and is not limited to the embodiments described herein. For a clearer understanding of the present disclosure, parts that are not of great relevance to the present disclosure have been omitted from the drawings, and like reference numerals in the drawings are used to represent like elements throughout the specification.

Throughout the specification, reference to a part "including" or "comprising" an element does not preclude the existence of one or more other elements and can mean other elements are further included, unless there is specific mention to the contrary. Also, terms such as "unit", "device", "module", "block", and the like described in the specification refer to units for processing at least one function or operation, which may be implemented by hardware, software, or a combination of hardware and software.

Figure 2:
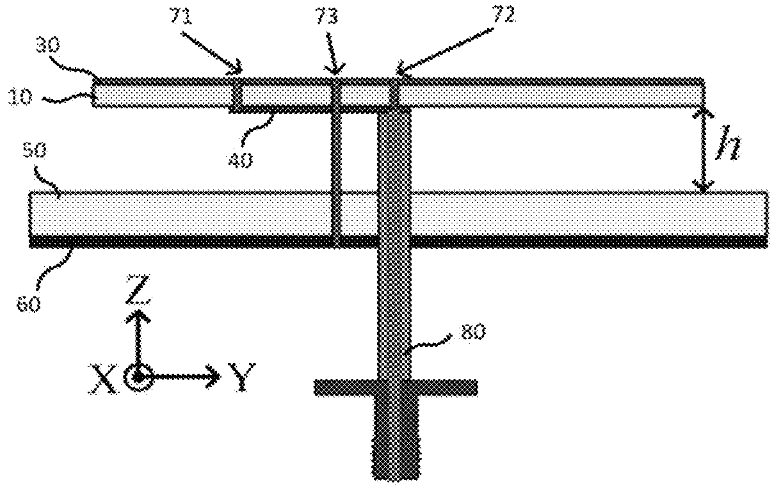
FIG. 2 shows a cross-sectional side view of the wearable antenna according to an embodiment of the present disclosure.
Figure 3:
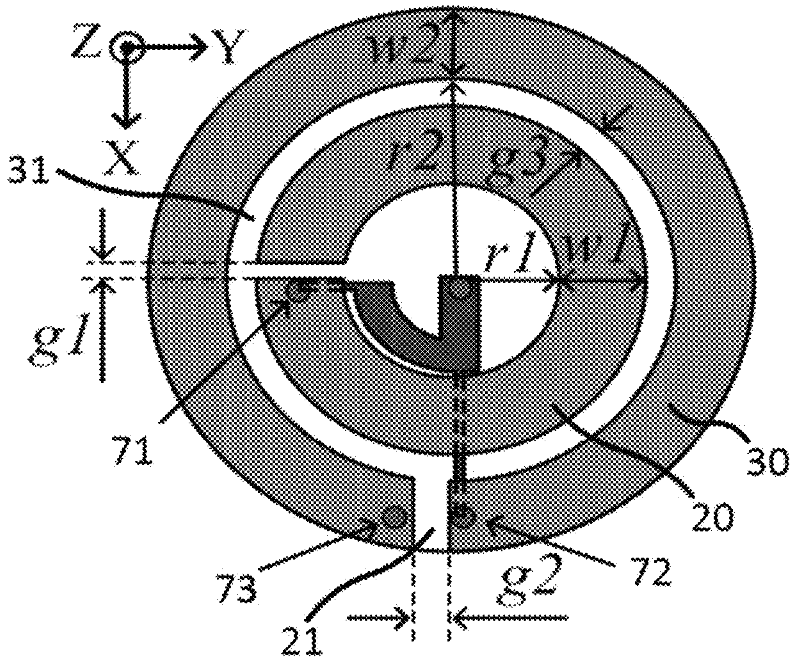
FIG. 3 shows a top view of the wearable antenna according to an embodiment of the present disclosure.
Figure 4:
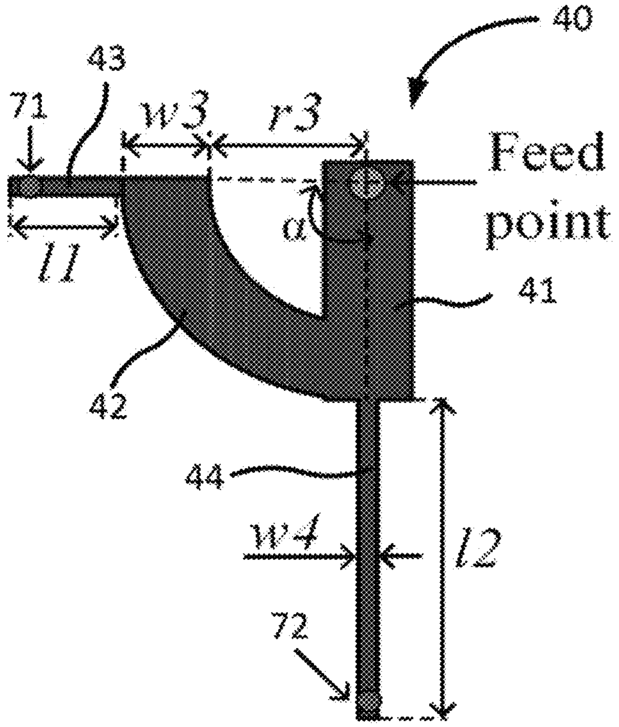
FIG. 4 is a diagram for explaining a structure of a feeding portion according to an embodiment of the present disclosure.

FIG. 1 shows an exploded perspective view of a wearable antenna according to an embodiment of the present disclosure, FIG. 2 shows a cross-sectional side view of the wearable antenna according to an embodiment of the present disclosure, and FIG. 3 shows a top view of the wearable antenna according to an embodiment of the present disclosure. And FIG. 4 is a diagram for explaining a structure of a feeding portion according to an embodiment of the present disclosure.

Referring to FIGS. 1 to 4, the wearable antenna according to an embodiment of the present disclosure can be largely divided into an upper structure and a lower structure. The upper structure includes an upper substrate 10, two open ring radiators 20 and 30, and a feeding portion 40.

The upper substrate 10 is implemented with a solid substrate made of a hard material, and has two open ring radiators 20 and 30 formed on its upper surface and a feeding portion 40 formed on its lower surface. Here, the upper substrate 10 may be made of a material having a low loss tangent in order to achieve high gain and high efficiency of the wearable antenna. Here, as an example, it is assumed that the upper substrate 10 is implemented with a TLY-5 substrate having a permittivity (ε) of 2.2, a loss tangent (tan δ) of 0.0009, and a thickness of 1.52.

The two open ring radiators 20 and 30 are formed in a ring shape with the same center and different inner radii (r1, r2: where r1<r2), each having a predetermined width (w1, w2), on the upper surface of the upper substrate 10. Here, among the two open ring radiators 20 and 30, the open ring radiator 20 having a relatively short inner radius (r1) is referred to as an inner open ring radiator, and the open ring radiator 30 having a relatively long inner radius (r2) is referred to as an outer open ring radiator.

And, by the inner radius (r1) and width (w1) of the inner open ring radiator 20 and the inner radius (r2) of the outer open ring radiator 30, the distance (g3) between the outer side of the inner open ring radiator 20 and the inner side of the outer open ring radiator 30 is r2−(r1+w1).

In addition, in an embodiment of the present disclosure, slits 31 and 21 having predetermined widths (g1, g2) are formed in the inner open ring radiator 20 and the outer open ring radiator 30, respectively, from the center to the outside, so that an open ring structure is formed in which a partial area of the ring is opened by the slits 31 and 21. At this time, the slits 31 and 21 formed in each of the inner open ring radiator 20 and the outer open ring radiator 30 are formed to extend in different directions. As an example, in the present embodiment, as shown in FIG. 3, the first slit 31 of the inner open ring radiator 20 and the second slit 21 of the outer open ring radiator 30 may be formed to extend in a direction perpendicular to each other (90 degrees). Here, the reason why the first slit 31 and the second slit 21 are formed to extend perpendicularly to each other is to enable the wearable antenna of this embodiment to be matched to the input impedance and operate in three required frequency bands.

Here, the inner open ring radiator 20 and the outer open ring radiator 30 each are designed to radiate signals of predetermined frequencies, and the two open ring radiators 20 and 30 having different radii (r1, r2) are in a state of being electrically connected to the feeding portion 40. Accordingly, while one of the two open ring radiators 20 and 30 operates as a radiator, the other one may operate as a load.

As shown in FIG. 2, the feeding portion 40 is formed on the lower surface of the upper substrate 10, and is formed in a structure corresponding to the opened one end sides of the two open ring radiators 20 and 30 such that it can provide a feed signal to one ends of the two open ring radiators 20 and 30.

As shown in FIG. 4, the feeding portion 40 includes a feed line 41 having one end formed on the lower surface of the upper substrate 10 corresponding to the center position of the two open ring radiators 20 and 30 and the other end extended outward by a predetermined length, and an arc line 42 formed by extending in an arc shape by a predetermined angular range (α) from the other end of the feed line 41. At this time, as shown in FIG. 3, the arc line 42 of the feeding portion 40 is formed inside the inner open ring radiator 20 so as not to overlap each other. Therefore, the outer radius (r3+w3) of the arc line 42 calculated as the sum of the inner radius (r3) and the line width (w3) of the arc line 42 must be smaller than the inner radius (r1) of the inner open ring radiator 20 ((r3+w3)<r1). Here, the angular range (α) of the arc line 42 is set to the angle between one ends opened by the slits 31 and 21 of the two open ring radiators 20 and 30. Here, since the two slits 31 and 21 of the two open ring radiators 20 and 30 are formed in an angle direction of 90 degrees to each other, the arc line 42 is formed in a form extending in a 90 degree angle range (α).

One end of a position corresponding to the center of the open ring radiators 20 and 30 in the feed line 41 serves as a feed point. Accordingly, a feed signal is applied to one end of the feed line 41 through an input port 80 such as a coaxial cable. Since the feed line 41 is configured to transmit the applied feed signal to the arc line 42, it may have a length up to the outer radius (r3+w3) of the arc line 42 such that the other end extends in a direction of one end of the outer open ring radiator 30. And the line width of the feed line 41 may be the same as that of the arc line 42 (w3).

Meanwhile, at each of both ends of the arc line 42 extending in an angle range of 90 degrees, two extension lines 43 and 44 extending to one end of each of the two open ring radiators 20 and 30 are further formed. Here, the two extension lines 43 and 44 may be formed with a line width (w4) narrower than the line width (w3) of the feed line 41. Among the two extension lines 43 and 44, the first extension line 43 is formed to extend from the other end of the arc line 42 to one end of the inner open ring radiator 20, and the second extension line 44 is formed to extend from one end of the arc line 42, that is, the other end of the feed line 41, to one end of the outer open ring radiator 30. Each of the two extension lines 43 and 44 may be formed to extend from both ends of the arc line 42 to the center of the widths (w1, w2) at one end of the inner open ring radiator 20 and the outer open ring radiator 30, respectively. In this case, the length (l1) of the first extension line 43 can be ((w1)/2+r1−(r3+w3)) as the sum of a distance from the outer radius (r3+w3) of the arc line 42 to the inner radius (r1) of the inner open ring radiator 20 and ½ length of the width (w1) of the inner open ring radiator 20. Similarly, the length (l2) of the second extension line 44 may be ((w2)/2+r2−(r3+w3)).

And, in each of the first and second extension lines 43 and 44, one end of which is connected to the arc line 42, the other end is electrically connected to one end of each of the corresponding open ring radiators 20 and 30 through first and second vias 71 and 72 formed through the upper substrate 10.

Line width (w3, w4) and length (l1, l2) of the feed line 41, arc line 42 and two extension lines 43 and 44, inner radius (r3) of the arc line 42, and the angular range (α) may be adjusted such that the feed signal is provided as a balanced signal having the same magnitude to the two open ring radiators 20 and 30. In particular, since the input impedance varies according to the lengths (l1, l2) of the two extension lines 43 and 44 and the angular range (α) of the arc line 42, impedance matching may be performed by adjusting the lengths (l1,l2) of the extension lines 43 and 44 and the angular range (α) of the arc line 42. Here, since the angular range (α) of the arc line 42 is the angle difference between the one ends opened by the slits in the two open ring radiators 20 and 30, and the lengths (l1, l2) of the extension lines 43 and 44 are controlled by the outer radius of the arc line 42, it can also be seen that the impedance is adjusted by the angle difference between the slits of the two open ring radiators 20 and 30 and the outer radius of the arc line 42.

That is, the feeding portion 40 matches the feed signal, applied to the feed point through the input port 80 at the center of the two open ring radiators 20 and 30 on the lower surface of the upper substrate 10, to the impedance (for example, 50Ω) of the input port 80 so that the feed signal is transmitted with equal magnitude to the two open ring radiators 20 and 30 through the first and second vias 71 and 72.

Meanwhile, in an embodiment of the present disclosure, the lower structure is spaced apart from the lower surface of the upper substrate 10 by a predetermined distance (h), and includes a lower substrate 50 and a ground plane 60.

The lower substrate 50 may be implemented with a flexible fabric substrate, and here, as an example, a felt having a thickness of 3 mm was used as the lower substrate 50. Further, the ground plane 60 is formed on the lower surface of the lower substrate 50, and a conductive fabric having a flexible characteristic similar to the lower substrate 50 may be used.

Existing wearable antennas have mainly used flexible substrates that are well bent for the wearer's convenience. This is because, in the case of using a substrate that is not easily bent, it may cause discomfort to the wearer due to the characteristics of the wearable antenna. However, the flexible substrate has a problem in that antenna performance is degraded due to a high loss tangent. Accordingly, in the present embodiment, the lower substrate 50 that can be closely attached to the wearer is implemented with a flexible substrate. On the other hand, the upper substrate 10, on which the two open ring radiators 20 and 30 are disposed while being spaced apart from the lower substrate 50 and not in close contact with the wearer, is implemented with a solid substrate that has a low loss tangent to achieve high gain and efficiency, so that the performance of the antenna is maintained while not causing discomfort to the wearer. In addition, since the upper substrate 10 is spaced apart from the lower substrate 50 and implemented as a solid, the two open ring radiators 20 and 30 and the feeding portion 40 respectively formed on the upper surface and lower surface of the upper substrate 10 are prevented from being deformed so that the wearable antenna can maintain its characteristics.

And the lower substrate 50 may be formed to have a larger width (ws>r2+w2) than the outer radius (r2+w2) of the outer open ring radiator 30 having a relatively large size among the two open ring radiators 20 and 30.

The ground plane 60 is formed on the lower surface of the lower substrate 50 to block signals radiated from the two open ring radiators 20 and 30 toward the wearer, thereby lowering the wearer's specific absorption rate (SAR). In addition, as shown in FIG. 2, the ground plane 60 may be electrically connected to the other end of the outer open ring radiator 30 through a third via 73 penetrating both the upper substrate 10 and the lower substrate 50.

Here, the third via 73 connects the outer open ring radiator 30 and the ground plane 60, thereby providing additional inductance to reduce the size of the antenna. In addition, the third via 73 serves as a support for supporting the upper substrate 10 to improve the structural stability of the wearable antenna.

Basically, as shown in FIG. 2, the upper substrate 10 may be supported by an input port 80 such as a coaxial cable inserted through the lower substrate 50 and the ground plane 60 of the lower structure, or a separate support structure, thereby being spaced apart from the lower structure by a predetermined distance (h). Here, the third via 73 serves as an additional auxiliary support so that the upper substrate 10 can stably maintain a predetermined distance from the lower structure.

Figure 5:
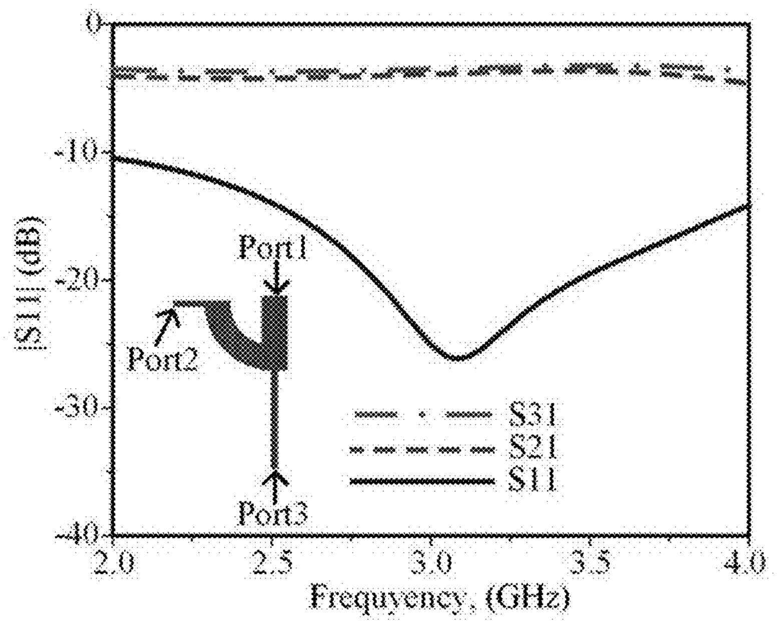
FIG. 5 shows S parameters of the feeding portion of FIG. 4.

FIG. 5 shows S parameters of the feeding portion of FIG. 4.

In an embodiment of the present disclosure, the wearable antenna is made to operate as a triple band antenna that can be used in all three frequency bands of 2.45 GHz for ISM (Industrial, Specific and Medical) applications, 3.0 GHz for military applications and 3.445 GHz for WiMAX applications.

Accordingly, in FIG. 5, to be optimized at 3.0 GHz, the feeding portion 40 was designed such that the inner radius r3 and line width w3 of the arc line 42 are 5.5 mm and 3.5 mm, respectively, the lengths (l1,l2) of the first and second extension lines 43 and 44 are 13 mm and 3.6 mm, respectively, and the line widths (w4) of the first and second extension lines 43 and 44 are identically 0.5 mm, and then simulated.

As shown in FIG. 5, it can be seen that the feeding portion 40 has a return loss (S11) of less than −10 dB for the input port 80 in the range of 2 to 4 Ghz, and has almost identical transmission losses (S21, S31) of −3.5±0.5 dB for each of the inner open ring radiator 20 and the outer open ring radiator 30. That is, a feed signal of equal magnitude can be transmitted to the two open ring radiators 20 and 30.

Figure 6:
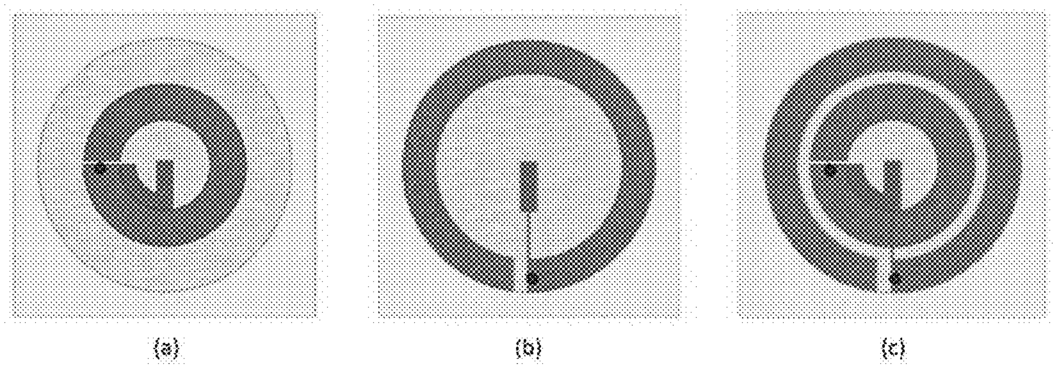
FIG. 6 shows an antenna configuration for explaining the operation of the wearable antenna according to according to an embodiment of the present disclosure.
Figure 7:
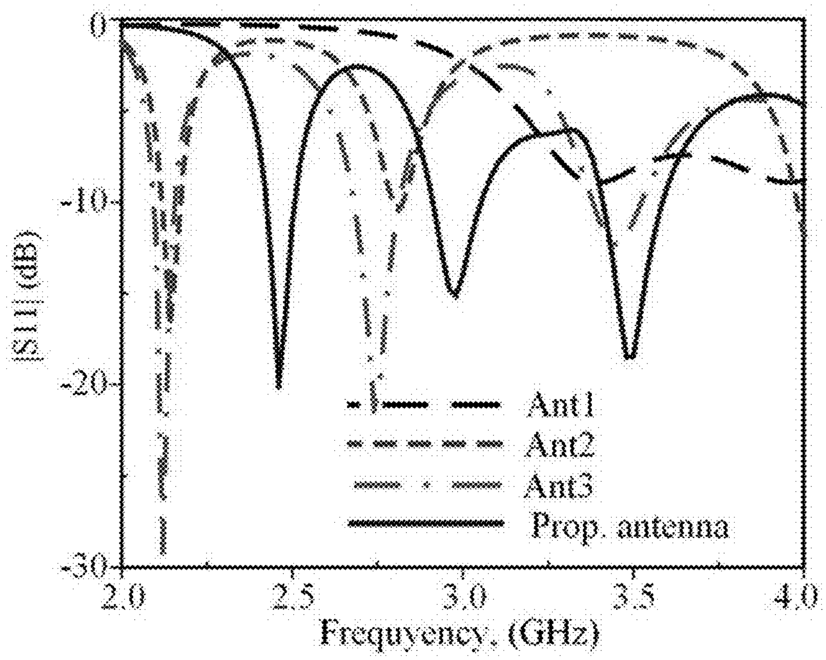
FIG. 7 shows return loss characteristics of the wearable antenna according to FIG. 6 and the present embodiment.
Figure 8:
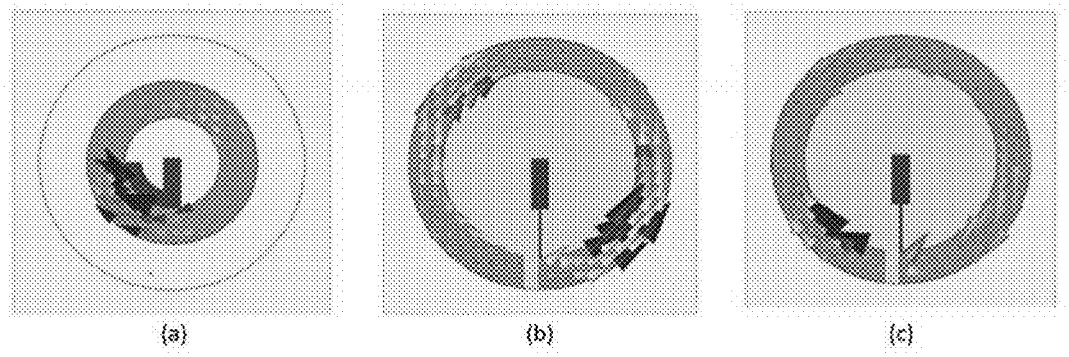
FIG. 8 shows the current distribution of the wearable antenna according to an embodiment of the present disclosure.

FIG. 6 shows an antenna configuration for explaining the operation of the wearable antenna according to an embodiment of the present disclosure, FIG. 7 shows return loss characteristics of the wearable antenna according to FIG. 6 and the present embodiment, and FIG. 8 shows the current distribution of the wearable antenna according to an embodiment of the present disclosure.

In FIGS. 6 and 7, the combination of the wearable antenna and components of the present embodiment is changed in order to examine the operation characteristics of each component in the wearable antenna of the present embodiment. The (a) of FIG. 6 shows an antenna (Ant1) having only an inner open ring radiator 20 by removing the outer open ring radiator 30, and (b) of FIG. 6 shows an antenna (Ant2) having only an outer open ring radiator 30 by removing the internal open ring radiator 20 and not connected to the ground plane 60. And (c) of FIG. 6 shows an antenna (Ant3) having both open ring radiators 20 and 30 but removing the third via 73 connecting the other end of the outer ring radiator 30 and the ground plane 60.

Referring to FIG. 7, the antenna (Ant1) having only the inner open ring radiator 20 operates as a half-wave antenna, and has low return loss due to impedance matching at 3.4 GHz and 4.0 GHz. As shown in (a) of FIG. 8, in the inner open ring radiator 20, the ring structure generates a TM11 mode at 3.4 GHz, and the first slit 31 generates a resonant mode at around 4.0 GHz.

Meanwhile, as shown in FIG. 7, the antenna (Ant2) having only the outer open ring radiator 30 is impedance-matched at around 2.1 GHz and at 2.8 GHz. As shown in (b) and (c) of FIG. 8, in the outer open ring radiator 30, the ring generates a TM11 mode as a basic mode at around 2.1 GHz, and the second slit 21 generates a half mode of TM1.5.1 at 2.8 GHz.

That is, the inner open ring radiator 20 may operate at 3.4 GHz and 4.0 GHz, and the outer open ring radiator 30 may operate at 2.1 GHz and 2.8 GHz.

And, in the case of the antenna (Ant3) shown in (c) of FIG. 6, while one of the two open ring radiators 20 and 30 operates as a radiator, the other operates as a load, which causes a change in operating frequency. Accordingly, the antenna (Ant3) generates a resonant mode at frequencies of 2.1 GHz, 2.75 GHz, and 3.45 GHz. In practice, the 4.0 GHz operating frequency of the inner open ring radiator 20 is also changed, but this is not considered here because a resonant mode is generated in a frequency band higher than 4.0 GHz, which is not a frequency band of interest.

Meanwhile, the wearable antenna according to an embodiment of the present disclosure is further provided with a third via 73 connecting the other end of the outer open ring radiator 30 and the ground plane 60 in the antenna (Ant3) shown in (c) of FIG. 6. Inductance is increased by the additionally provided third via 73, and as a result, as shown in FIG. 7, 2.1 GHz of the operating frequencies of the antenna (Ant3) is moved to 2.45 GHz, and 2.75 GHz is moved to 3.0 GHz, so the antenna (Prop.antenna) according to the present embodiment may have operating frequencies of 2.45 GHz, 3.0 GHz, and 3.45 GHz.

Figure 9:
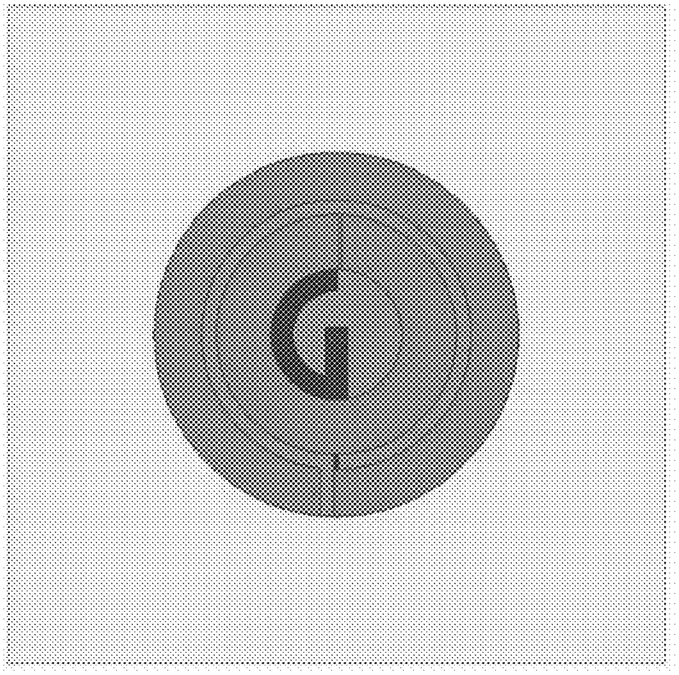
FIG. 9 shows a configuration of an antenna having a different slit direction for comparison with the wearable antenna according to an embodiment of the present disclosure.
Figure 10:
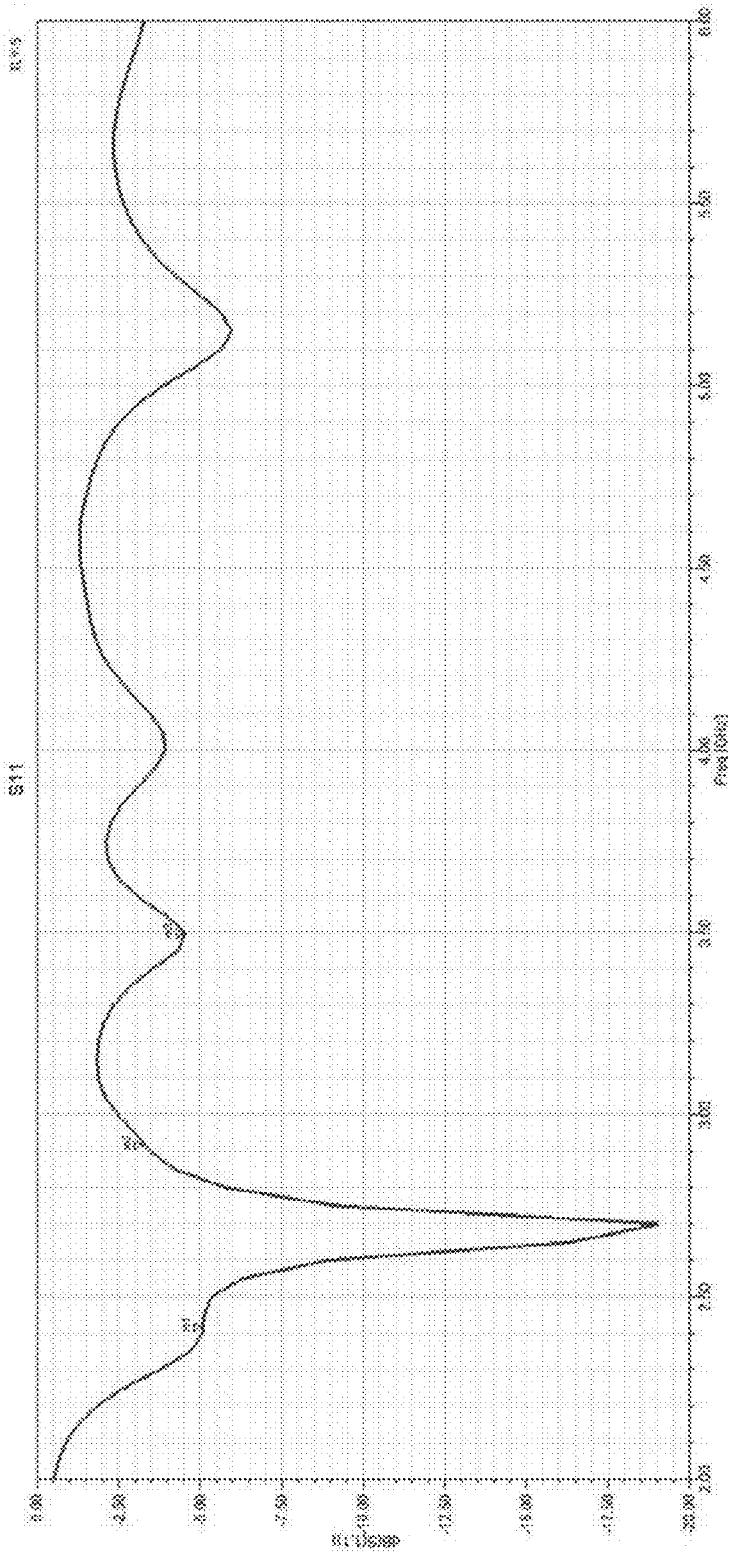
FIG. 10 shows return loss characteristics of the wearable antenna of FIG. 9.

FIG. 9 shows a configuration of an antenna having a different slit direction for comparison with the wearable antenna according to an embodiment of the present disclosure, and FIG. 10 shows return loss characteristics of the wearable antenna of FIG. 9.

As described above, in the wearable antenna of the present embodiment, it has been described that the first slit 31 of the inner open ring radiator 20 and the second slit 21 of the outer open ring radiator 30 extend in a perpendicular direction (90 degrees) to each other. Although the angle between the first slit 31 and the second slit 21 may be set in various ways, when the first and second slits 31 and 21 are formed in the same direction (0 degree angle) and there is no angle difference, the feeding portion 40 cannot separately apply a feed signal to each of the first slit 31 and the second slit 21, so it cannot be implemented structurally.

Accordingly, in FIG. 9, as another example of a wearable antenna, a case is shown in which the first slit 31 of the inner open ring radiator 20 and the second slit 21 of the outer open ring radiator 30 are formed at an angle of 180 degrees. As shown in FIG. 9, when the first slit 31 and the second slit 21 formed in the two open ring radiators 20 and 30 have an angular difference of 180 degrees from each other, the return loss appears as shown in FIG. 10.

Referring to FIG. 10, when the two slits 31 and 21 are formed at an angle of 180 degrees to each other, the antenna operates only in 2.7 GHz band and does not operate in the other frequency bands. That is, the resonant frequencies at 3.0 GHz and 3.45 GHz disappear and cannot operate in the required triple band.

As a result, when the angle between the first slit 31 and the second slit 21 is 0 degrees, it cannot be structurally implemented, and when it is 180 degrees, it does not have the required operating characteristics. Therefore, in the present embodiment, the first slit 31 of the inner open ring radiator 20 and the second slit 21 of the outer open ring radiator 30 are formed at an angle of 90 degrees to each other.

While the present disclosure is described with reference to embodiments illustrated in the drawings, these are provided as examples only, and the person having ordinary skill in the art would understand that many variations and other equivalent embodiments can be derived from the embodiments described herein.

Therefore, the true technical scope of the present disclosure is to be defined by the technical spirit set forth in the appended scope of claims.

What is claimed is:

1. A wearable antenna, comprising:

an upper substrate made of a solid material;

an inner open ring radiator formed in a ring shape on an upper surface of the upper substrate and having a first slit formed therein to open a partial area;

an outer open ring radiator formed in a ring shape having the same center as the inner open ring radiator and having a larger radius on the upper surface of the upper substrate, and having a second slit formed therein to open a partial area;

a feeding portion formed on a lower surface of the upper substrate and transmitting a feed signal applied from an input port to each of the two open ring radiators through two vias penetrating the upper substrate;

a lower substrate spaced apart from a lower surface of the upper substrate by a predetermined distance and made of a flexible material; and a ground plane formed on a lower surface of the lower substrate, wherein the first slit and the second slit are formed in a direction extending perpendicularly to each other.

2. The wearable antenna according to claim 1, wherein the feeding portion includes:

an arc line formed in an arc shape having an angular range corresponding to an angle difference between the first slit and the second slit;

a feed line extending from a central position of the two open ring radiators to which the input port is connected on the lower surface of the upper substrate to one end of the arc line; and two extension lines extending from both ends of the arc line, to one end of the area side opened by the first and second slits in each of the inner open ring radiator and the outer open ring radiator.

3. The wearable antenna according to claim 2, wherein an outer radius of the arc line is smaller than an inner radius of the inner open ring radiator.

4. The wearable antenna according to claim 2, wherein the two extension lines have a line width smaller than a line width of the arc line and the feed line.

5. The wearable antenna according to claim 4, wherein a first extension line of the two extension lines extends from one end of the arc line to one end of the inner open ring radiator, and is electrically connected to the one end of the inner open ring radiator through a first via of the two vias, and wherein a second extension line of the two extension lines extends from the other end of the arc line to one end of the outer open ring radiator, and is electrically connected to the one end of the outer open ring radiator through a second via of the two vias.

6. The wearable antenna according to claim 5, wherein lengths of the first and second extension lines and an angular range of the arc line is determined to be impedance-matched with the input port connected to the feed line.

7. The wearable antenna according to claim 2, wherein the wearable antenna further includes a via passing through the upper substrate and the lower substrate and electrically connecting the outer open ring radiator and the ground plane.

8. The wearable antenna according to claim 1, wherein the upper substrate maintains a predetermined distance from the lower substrate by being supported by an input port that passes through the lower substrate and applies a feed signal to the feeding portion formed on the lower surface of the upper substrate.

* * * * *